Dec. 26, 1967 E. A. VON SEGGERN ET AL 3,359,958
EXCESS AIR CYCLE ENGINE AND AIR SUPPLY MEANS
AND METHOD OF OPERATING SAME
Original Filed Aug. 19, 1963 2 Sheets-Sheet 1
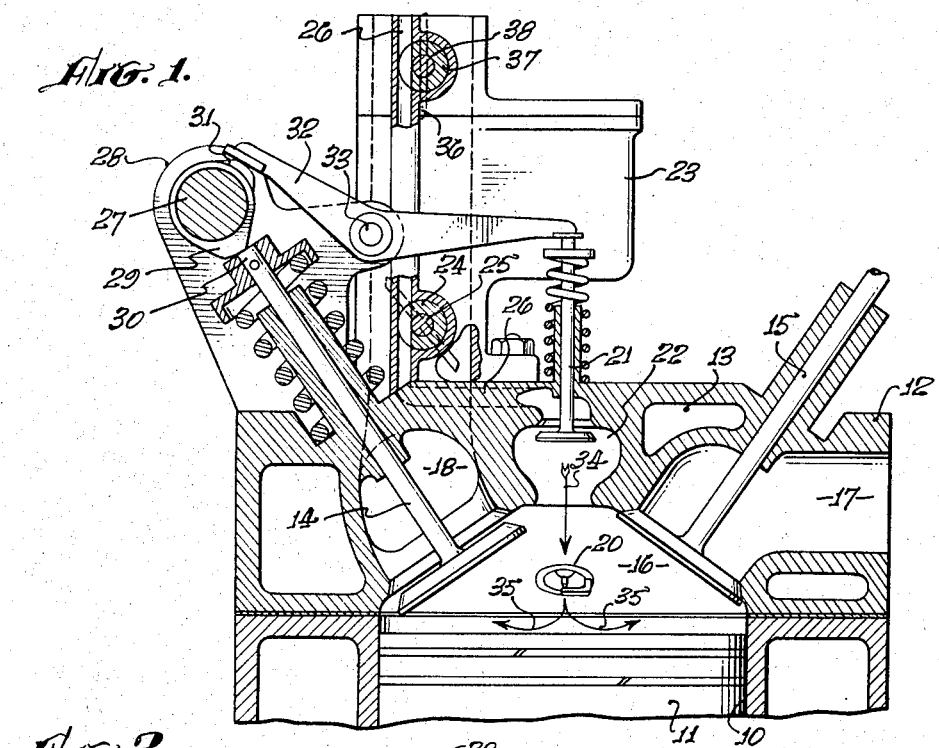
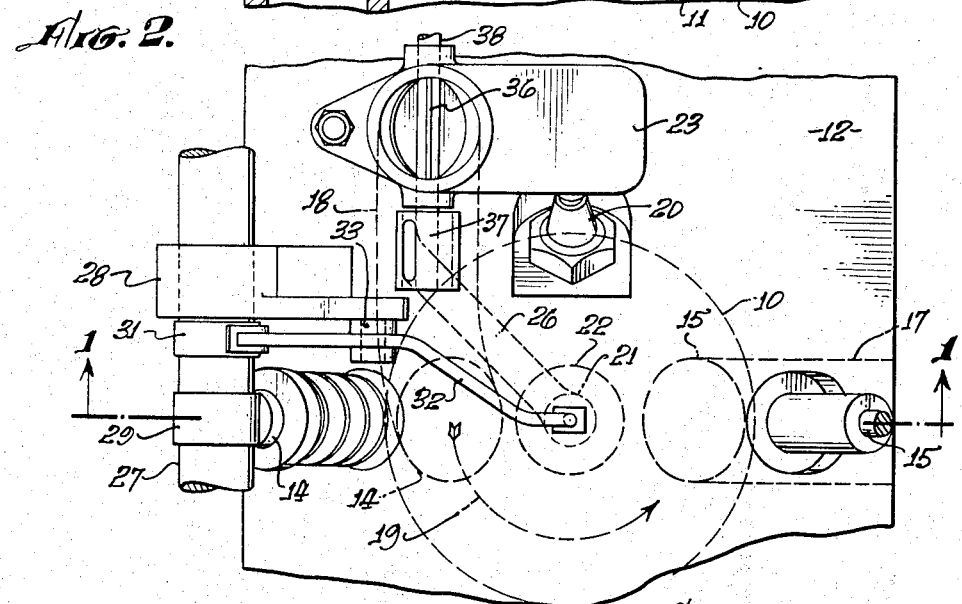
ERNEST A. VON SEGGERN,
HENRY E. VON SEGGERN,
INVENTORS
BY
ATTORNEY.

ERNEST A. VON SEGGERN,
HENRY E. VON SEGGERN,
INVENTORS.

BY

ATTORNEY.

United States Patent Office 3,359,958
Patented Dec. 26, 1967

3,359,958
EXCESS AIR CYCLE ENGINE AND AIR SUPPLY
MEANS AND METHOD OF OPERATING SAME
Ernest A. von Seggern, 1051 E. Angeleno, Burbank, Calif.
91501, and Henry E. von Seggern, Rte. 2, Box 1910,
Escondido, Calif. 92025
Continuation of application Ser. No. 303,116, Aug. 19,
1963. This application Aug. 29, 1966, Ser. No. 579,450
12 Claims. (Cl. 123—75)

ABSTRACT OF THE DISCLOSURE

An engine is provided in which separate bodies of working fluid, of which one contains, at least, an excess of air, and the other is an ignitable and combustible fuel-air mixture, are held in stratified relation prior to combustion by means of a system of circulation in which one body of working fluid is placed along an axis and the other body of working fluid circulates around said axis in a plane substantially normal to said axis. The axis of circulation is substantially the same as the length axis of the engine cylinder. The separate bodies of fluid are introduced into the cylinder through separate manifolds each having a flow control valve, but in some forms the two bodies may enter the cylinder through a single intake valve opening into the cylinder. Additional flow control throttles are also provided.

---

This application is a continuation of our copending application Ser. No. 303,116, filed Aug. 19, 1963, entitled, Excess Air Cycle Engine and Air Supply Means and Method of Operating Same, which was a continuation-in-part of our application, Ser. No. 296,311, filed July 19, 1963, and entitled, Excess Air Cycle Engine and Air Supply Means and Method of Operating Same, now abandoned.

This invention relates to internal combustion engines of the class which utilize excess air in the combustion process, and in particular to engines which operate with two distinct, stratified fuel charges of different fuel-air ratios in the combustion chamber. Fuels such as gasoline or light distillate are suitable for use and ignition is generally by electric spark. The method of operation follows in part the basic principles disclosed in our applications entitled, Excess Air Cycle Engine, Ser. No. 278,383, filed May 6, 1963; Dual Fuel Supply Means for Excess Air Cycle Engine, Ser. No. 283,089, filed May 24, 1963; and Excess Air Cycle Engine and Fuel Supply Means, Ser. No. 288,033, filed June 14, 1963. The subject matter of these applications is incorporated herein by this reference.

It is a general object of the invention to provide an engine of the type described in which fuel is burned in combination with air in excess of stoichiometric proportions and a clean, odorless, non-smog producing combustion is obtained. Another object is to provide an engine which is capable of achieving higher thermal efficiency at part load than the standard gasoline engine, but which does not sacrifice any of the performance or high output of the standard engine.

Another more specific object includes the provision of an engine which employs a standard carburetor and fuel supply means, and coordinates its function with means for supplying localized air to the combustion process.

Additional general objects and features of the invention, as well as special objects and features, will be described in the specification in conjunction with the description of the specific forms shown herein.

The engines by means of which the foregoing objects are attained all combine a fuel-air charge of substantially stoichiometric proportions with a localized body of air, and add the air to the combustion only after the burning of the stoichiometric fuel-air mixture has been substantially completed. The burning of lean mixtures is avoided, i.e. the excess air is not added to the mixture prior to or during the initial phase of combustion. There are two distinct methods by which the air is kept separate from the fuel mixture. First, there is a dynamic method, in which the contents of the combustion chamber circulate about an axial zone, with either the fuel mixture circulating around the air zone or the air circulating about the fuel zone. Secondly, there is a static method, in which the air is held in a separate pocket or somewhat isolated zone, and the fuel mixture and air body are formed separately and held separately until combustion is substantially completed. These two methods are also combined in which the fuel mixture and air are first held separately in the engine cylinder by the dynamic method, and the air is then compressed into the isolated zone during the compression cycle and held by the static method during the initial phase of the combustion.

The fuel mixture portion of the total charge supplied to the engine is generally substantially larger in volume than the air supplied, but this may vary widely. When air is added to a fuel mixture prior to combustion, the result is a lean, slow burning combustion with high exhaust temperatures. On the other hand, air which is added to the combustion after the burning is nearly complete, but before substantial expansion occurs, produces a clean, fast burning combustion with a cool exhaust.

The manner in which excess air is added and localized and coordinated with the stoichiometric fuel mixture varies in different forms of the engine. The features of each will be described in conjunction with the description of the several forms. It will be evident that, while the engines are shown with carburetors, this particular fuel supply means is not a part of the invention, and any other known fuel supply means can be substituted therefor. In the accompanying drawings, showing typical illustrative embodiments of the broad invention:

FIG. 1 is a vertical section of the first form of the engine taken along the broken line 1—1 of FIG. 2;

FIG. 2 is a plan view of the engine shown in FIG. 1;

Figure 3:
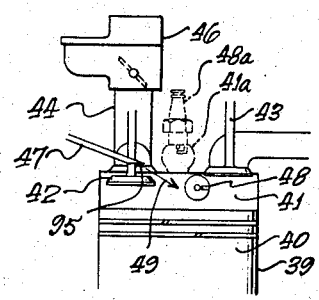
FIG. 3 is a diagrammatic vertical section of an alternate form of the engine using a single admission valve and a cylindrical combustion chamber.

The first form of the engine will be described as it is incorporated in a conventional four-cycle, water-cooled, valve-in-head engine, but it is evident that air cooling or other forms of cooling may be employed and that the principles could also be adapted to two cycle forms. In FIGS. 1 and 2, a cylinder 10 with reciprocating piston 11 therein has a cylinder head 12 fastened onto the upper end, and both cylinder head 12 and cylinder 10 are water cooled by means of jacket 13. Air inlet valve 14 and an exhaust valve 15 are located in head 12 above said cylinder.

The combustion chamber 16 is formed within head 12 and is substantially spherical in shape, and has the intake and exhaust valves placed therein with inclined valve stems relative to the axis of cylinder 10 in the manner common to this class of chamber. Exhaust valve 15 opens into an exhaust port 17, and intake valve 14 opens into an intake manifold 18. Said manifold 18 is arranged tangentially relative to the cylinder 10, so that gases entering said cylinder through valve 14 flow in a circular, spiral path therein as shown by flow line 19.

A spark plug 20 is located substantially between said valves at a point adjacent to the cylinder, in the line of flow of the circulating gases in said combustion chamber. An air admission valve 21 is located between said valves 14 and 15 at a point substantially on the central axis of cylinder 10 which coincides roughly with the axis about which the gases in said cylinder circulate. Air valve 21 is preferably set back in a shallow pocket 22 as shown, but the size of said pocket may vary from nothing up to one whose volume is equal to one-half the total volume of the combustion chamber or more. A standard carburetor 23 is mounted on the end of intake manifold 18. An air flow control valve 24 may conveniently be placed on throttle rod 25 of said carburetor 23 and an air tube 26 connects said valve 24 and said air admission valve 21.

The engine is shown with a conventional overhead cam shaft 27 (exhaust valve cam shaft not shown). Shaft 27 is mounted in bearing 28 and is driven by the usual gearing or chain (not shown). A cam 29 engages inlet valve stem 30 and operates the valve in the usual manner. A second cam 31 is provided, which engages rocker arm 32, mounted on pivot 33. This rocker arm operates valve 21, and is timed to open valve 21 substantially simultaneously with intake valve 14.

When operating at full load, the engine is substantially conventional. No air is admitted through valve 21 and a standard full, unthrottled fuel charge is admitted to cylinder 10 through intake valve 14. The only difference from standard practice is that the charge circulates about the axis of said cylinder, but this circulation is no more, generally speaking, than the usual flow. The spark plug is in the line of flow, but is located near the cylinder 10 instead of in the usual central position between the valves. As a result the maximum output and performance of the engine is substantially equal in every respect to the standard engine.

When idling, or at part load operation, the air flow control valve 24 on the throttle rod 25 opens and allows air to enter the combustion chamber 16 through valve 21 simultaneously with the entry of the standard fuel-air mixture from carburetor 23 through valve 14. The fuel mixture circulates around the cylinder as shown by flow line 19, while the air enters on the axis of spin as shown by line 34. The shallow pocket 22 tends to collect and confine the air after it leaves the valve, so that it enters the combustion chamber axially and at low velocity. The air tends, therefore, to remain on the axis while the fuel-air mixture circulates around it. Such mixing as takes place forms a localized lean fuel-air mixture which is surrounded by a normal fuel-air mixture. The motion of the piston during the intake and compression stroke does not materially alter the circulating pattern, but it does tend to compress the air back into the pocket.

Near the end of the compression stroke the spark plug 20 ignites the normal mixture, which burns quickly with normal speed and the flame converges on the lean central core. The high temperatures cause almost instant burning of any fuel in this localized area regardless of the fuel-air ratio, and the excess air spreads out through the entire flaming charge early in the power stroke to completely oxidize any unburned fuel present after the burning of the conventional fuel charge.

The size of the pocket 22 may vary quite widely, and its size influences the manner in which the excess air is mixed with the normal charge. When there is no pocket, the air collects along the central zone of the combustion chamber. When combustion occurs this air mixes very quickly with the main combustion, especially since it is in the central zone of the main charge.

When the air is confined in a large pocket, this air remains essentially pure up to the time of ignition, except that some of the fuel charge is compressed into the pocket. When combustion occurs, the normal fuel charge outside the pocket burns initially without intermixture with excess air. This insures a fast burning combustion, which spreads through the main combustion chamber. Some of the hot gases also compress into the pocket and a combustion takes place therein also, but a considerable quantity of hot excess air is still present. When the power stroke begins, the contents of the pocket discharge centrally downward as shown by flow line 34, and mix in a circulating, toroidal manner quickly and completely with the burned fuel charge in the main combustion chamber as shown by flow lines 35. The excess air finishes any unfinished combustion during the power stroke.

Air valve 24 can be designed to vary the quantity of air admitted at various throttle positions in any desirable manner.

When starting the engine, especially under cold conditions, the air may be all closed off, and this may conveniently be related to the usual choke means. The air tube 26 is extended from valve 24 up to the choke 36 and a valve 37 is placed on the end of choke rod 38 as shown. When the choke is closed for starting the air is closed off, but is opened again as soon as the choke is opened.

Figure 4:
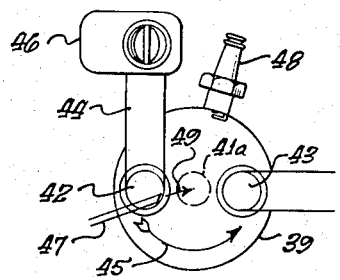
FIG. 4 is a plan view of the engine shown in FIG. 3.

There are alternate ways in which the foregoing principles may be combined in an engine. FIGS. 3 and 4 show a design which differs from the first embodiment of the invention principally in the means by which air is admitted to the cylinder. Instead of admitting the air through an auxiliary valve, the air enters through the intake valve simultaneously with the stoichiometric carbureted fuel-air mixture, but is directed to flow in a different direction than the carbureted charge. It is directed toward the region of the axis of rotation of the main carbureted charge while the said carbureted charge enters the cylinder tangentially.

In FIGS. 3 and 4, a cylinder 39 has a piston 40 therein, and a combustion chamber 41 at the top. Intake valve 42 and exhaust valve 42 open into this chamber and are shown as vertical valves by way of illustration. A spherical combustion chamber with inclined valves as in FIGS. 1 and 2 could be used if desired. The intake manifold 44 is arranged tangentially to the cylinder so that the fuel mixture entering the cylinder during the intake cycle circulates about the central axis of said cylinder as shown by flow line 45. A conventional stoichiometric fuel-air mixture is supplied to said intake manifold by a standard carburetor 46.

An air tube 47 is provided which enters the intake manifold 44 near said intake valve 42 in a direction substantially normal to the cylinder, and is oriented so that air will pass through valve 42 when it is open, and flow toward the center of said cylinder.

A spark plug 48 is located in said combustion chamber in the line of flow 45. During the intake cycle, the carbureted fuel-air charge enters cylinder 39 through valve 42 and circulates about said cylinder in a circular rotation as indicated by line 45. Simultaneously air flows through tube 47 as shown by flow line 49 and collects along the central axis of spin of said fuel mixture. The piston then compresses the entire charge and the outer, stoichiometric portion is ignited by plug 48, and combustion proceeds as described in the first embodiment. The control of air and fuel mixture is also identical to that already described. Air tube 47 may be connected to the carburetor with air flow control valves as described in the engine shown in FIGS. 1 and 2.

This form of engine is shown without any auxiliary pocket to hold the added air, as was shown in FIGS. 1 and 2. In this form, as well as in others to be described later, the pocket may be added, and is indicated in dotted outline 41a on the central axis of cylinder 39. Air supplied to the central region of the combustion chamber 41 during the intake cycle is compressed, to a considerable extent, into this pocket during the compression cycle. This localizes the air, as in the first embodiment, so that it enters the combustion in a slightly delayed manner after the initial combustion is completed.

At full load little or no air is added and under these conditions pocket 41a is charged with a combustible fuel-air mixture. If there is a tendency for this charge to detonate when combustion is initiated in the combustion chamber in the normal manner, this can be eliminated by placing an auxiliary spark plug 48a in the auxiliary pocket 41a and igniting the fuel simultaneously with the main fuel charge. This may also be done in the engine of FIGS. 1 and 2 if desired, or in any of the other alternate embodiments to be described.

Figure 5:
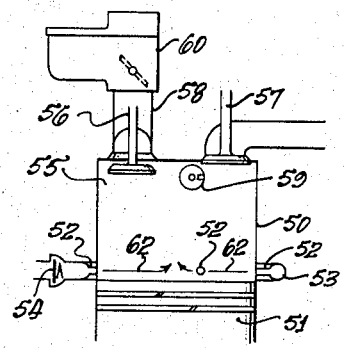
FIG. 5 is a diagrammatic vertical section of an alternate form of the engine using air admission ports in the cylinder.
Figure 6:
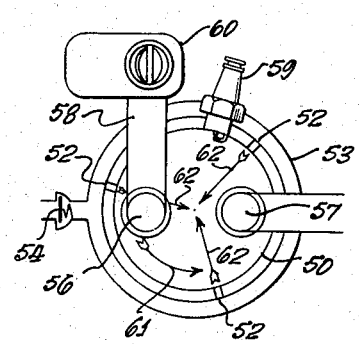
FIG. 6 is a plan view of the engine shown in FIG. 5.

Another embodiment is shown in FIGS. 5 and 6, and this differs from that shown in FIGS. 3 and 4 in the means for admitting air to the cylinder. A cylinder 50 has a piston 51 which, when at the bottom of its stroke, uncovers air ports 52. These ports are connected by a manifold 53 and the entrance to said manifold is provided with a check valve 54. This valve admits air to the manifold, but prevents backflow from said cylinder into the atmosphere. The combustion chamber 55 is provided with the same type intake and exhaust valves 56 and 57, tangential intake manifold 58, spark plug 59 and carburetor 60, as in FIGS. 3 and 4.

During the intake stroke, a normal carbureted mixture enters cylinder 50 as shown by flow line 61. Near the end of the intake stroke of piston 51, the ports 52 are uncovered, and air enters in streams 62 which converge at the center of the cylinder along the axis of rotation of the rotating fuel mixture. The piston then compresses the entire charge and the spark plug ignites the outer stoichiometric fuel mixture and the cycle completes as described before. At the end of the exhaust stroke, check valve 54 prevents exhaust gases from exhausting through the air manifold 53. Fuel and air control are the same as already described.

Figure 7:
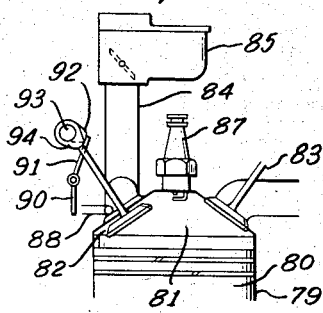
FIG. 7 is a diagrammatic vertical section of an alternate form of the engine using a method of charge localization in which the excess air is placed at the periphery of the rotating fuel-air charge.
Figure 8:
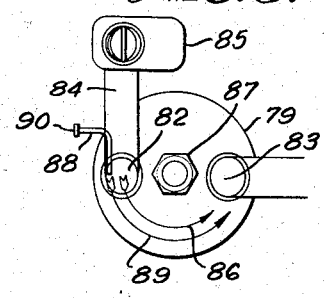
FIG. 8 is a plan view of the engine shown in FIG. 7.

A further modification is shown in FIGS. 7 and 8. This embodiment differs from all those already described in that the ignitable, stoichiometric fuel-air mixture is collected along the axis of rotation of the mixture, and is ignited on said axis, while air is added around the outside of the mixture.

A cylinder 79 has a piston 80 therein, and is shown with a spherical combustion chamber 81 which has inclined intake and exhaust valves 82 and 83. An intake manifold 84 is provided, tangential to said cylinder, and is supplied with a normal fuel mixture by a carburetor 85. Fuel, entering the cylinder during the intake stroke, follows the flow line 86, and a spark plug 87 is provided between said valves. An air tube 88 opens into said intake manifold directly behind said intake valve, and is oriented to deliver air in a stream which flows adjacent the cylinder wall parallel to, but outside of the mixture, as shown by flow line 89. A valve 90 may be provided to control the admission of air to said tube, and valve 90 is operated by rocker arm 91 which in turn is operated by cam 92 on cam shaft 93. Cam shaft 93 has another cam 94 which operates intake valve 82.

Intake valve 82 is opened in the usual manner during the intake cycle and a stoichiometric fuel mixture is drawn into the cylinder. If valve 90 is used, it may be opened late in the intake cycle, to delay the entry of air into the cylinder. But normally both fuel mixture and excess air enter the cylinder simultaneously and the entire charge is then compressed and the stoichiometric central core is ignited by spark plug 87. Combustion and the control of fuel and air are the same as already described.

In all the forms having an air tube behind the intake valve, it is desirable, especially in multiple cylinder designs, to have the tube fit the contour of the back of the intake valve so that the tube is automatically closed when the intake valve is closed. This is shown in FIG. 3, where the end of tube 47 is cut in a valve seat 95 which fits the back side of the head of valve 42. In multiple-cylinder designs the auxiliary air tubes are branched like the intake manifold, and have a common air inlet which is controlled by the air valves associated with the carburetor.

It is understood that the invention is not limited to the precise structures shown and described, but also includes such modifications as may be embraced within the scope of the appended claims.

We claim:

1. In the operation of an internal combustion engine of the four cycle type which utilizes at least two bodies of working fluid of different composition during the engine cycle and of which one body consists of a quantity of substantially stoichiometric fuel-air mixture, and the other body contains air at least in excess of that contained in a stoichiometric fuel-air mixture, the method of holding said bodies substantially separate in said engine during at least the compression cycle prior to ignition, which includes as steps: positioning one of said bodies of working fluid along an axis substantially co-axial with the cylinder of said engine; directing the other of said bodies of working fluid to circulate about said axially positioned body in a path at a larger radial distance from said axis than said axially positioned body; maintaining said circulation while simultaneously compressing both bodies of working fluid; and igniting said body of working fluid consisting of a substantially stoichiometric fuel-air mixture.

2. In the operation of an internal combustion engine of the type which utilizes a body of substantially stoichiometric fuel-air mixture and a separate body of air during the combustion cycle, the method of supplying said fuel mixture and said air body to said engine and promoting the combustion thereof, which includes as steps: directing said fuel-air mixture to circulate about an axis in a flow path at a substantial radial distance from said axis and in a plane substantially normal to said axis during the intake cycle of said engine; supplying said body of air to a partially confined region substantially co-axial with said axis of circulation of said fuel-air mixture during said intake cycle; compressing said fuel-air mixture and said air body during the compression cycle of said engine by displacement thereof along said axis and in a plane substantially normal to said axis; igniting said fuel-air mixture; and directing the air from said confined region into said ignited and burning fuel-air mixture after the pressure of said burning mixture has begun to fall due to expansion thereof during the power cycle.

3. In an internal combustion engine of the type which utilizes dual bodies of working fluid of which one consists of a substantially stoichiometric fuel-air mixture and the other of a body of working fluid which contains a quantity of air at least in excess of stoichiometric proportions with any fuel present therein, and which holds said bodies separate in the cylinder and combustion chamber of said engine at least up to the time of ignition of the fuel-air mixture, the combination of: a cylinder; a piston in said cylinder; a cylinder head forming a combustion chamber above said piston; dual working fluid admission means for admitting said working fluids to said combustion chamber and said cylinder substantially in advance of the compression cycle of said engine; wall means associated with said admission means having an orientation to direct one of said bodies of working fluid to a position substantially close to the central length axis of said cylinder; additional wall means to direct the other of said bodies of working fluid to flow in a circulating path in said cylinder in planes substantially normal to said length axis and around said axially positioned body in paths radially more distant from said axis than said axially positioned body; and a spark plug in said combustion chamber located in a region in contact with the body of working fluid consisting of a substantially stoichiometric fuel-air mixture.

4. In an internal combustion engine of the type having dual working fluid admission means, of which one supplies a combustible fuel-air mixture to said engine, and one supplies excess air, the combination of: a fuel-air mixture supply means, including a choke, joined to one of said dual admission means; and an air flow control valve associated with said choke, and connected to said excess air admission means joined to the other of said dual admission means, whereby said air is prevented from entering said cylinder through said air admission means when said choke is closed.

5. In an internal combustion engine of the type which utilizes dual bodies of working fluid, of which one consists of a substantially stoichiometric fuel-air mixture and the other of a body of working fluid which contains a quantity of air at least in excess of stoichiometric proportions with any fuel present therein, and which holds said bodies separate in the cylinder and combustion chamber of said engine at least up to the time of ignition of the fuel-air mixture, the combination of: a cylinder; a piston in said cylinder; a cylinder head forming a combustion chamber above said piston; an intake valve opening into said combustion chamber; a first intake manifold in communication with said intake valve; a second intake manifold opening into said first intake manifold in close proximity to said intake valve; a flow control valve in said second intake manifold adapted to open and close substantially in synchronism with said intake valve; wall means in combination with said first intake manifold to direct working fluid flowing therethrough to enter said cylinder through said intake valve in a given direction; additional wall means in combination with said second intake manifold to direct working fluid flowing therethrough to enter said cylinder through said intake valve in a different direction than the flow of working fluid entering said cylinder from said first intake manifold; and supplying one of said bodies of working fluid to said first intake manifold, and the other of said bodies of working fluid to said second manifold.

6. A combination as in claim 5, in which said flow control valve in said second intake manifold is opened and closed independently of said intake valve, but substantially during the time said intake valve is open.

7. A method of operation as in claim 1, wherein one body of working fluid is directed to circulate about an axis at a short radial distance from said axis; and the other of said bodies of working fluid is directed to circulate around said one body of circulating working fluid at a larger radial distance from said axis and in the same direction of flow.

8. A method of operation as in claim 1, wherein the axis of circulation extends into a recess wherein at least a portion of said one body of working fluid is retained prior to combustion.

9. A method of operation as in claim 2, wherein the air is directed into the burning mixture in a toroidal path substantially normal to and coaxial with said axis.

10. An internal combustion engine as in claim 3 which includes a throttle for controlling the quantity of fuel-air mixture admitted to said cylinder; and an air flow control valve associated with said excess air admission means and connected to said throttle means; whereby said fuel mixture and said excess air are limted in substantially direct proportion when said throttle is opened and closed.

11. In an internal combustion engine of the type which holds a substantially stoichiometric fuel-air mixture and a body of air separately in the cylinder of said engine prior to combustion, the combination of: a cylinder; a piston in said cylinder; a cylinder head forming a combustion chamber above said piston; an intake valve opening into said combustion chamber; fuel supply means for supplying a fuel-air mixture of substantially stoichiometric proportions to said cylinder through said intake valve; wall means for directing said mixture to flow in said cylinder in a circulating path about the central length axis of said cylinder; there being a pocket in said cylinder head opening into said combustion chamber at a point substantially coaxial with said cylinder; air admission valve means in said pocket; and ignition means in said cylinder head near the periphery of said cylinder.

12. In an internal combustion engine of the type which holds a substantially stoichiometric fuel-air mixture and a body of air separately in the cylinder of said engine prior to combustion, the combination of: a cylinder; a piston in said cylinder; a cylinder head forming a combustion chamber above said piston; an intake valve opening into said combustion chamber; fuel supply means for supplying a fuel-air mixture of substantially stoichiometric proportions to said cylinder through said intake valve; wall means for directing said mixture to flow in said cylinder in a circulating path about the central length axis of said cylinder; a nozzle in said cylinder head opening into said combustion chamber at a point substantially coaxial with said cylinder; there being a pocket joined to said nozzle opposite said combustion chamber; air admission valve means in said pocket; and ignition means in said cylinder head near the periphery of said cylinder.

References Cited

UNITED STATES PATENTS

| | | | |
|---|---|---|---|
| 1,643,396 | 9/1927 | Trussell | 123—75 |
| 2,240,088 | 4/1941 | Birkigt | 123—75 |
| 2,242,990 | 5/1941 | Brown | 123—75 |
| 2,914,041 | 11/1959 | Froehlich | 123—75 |
| 3,087,480 | 4/1963 | Baudry | 123—119 |

WENDELL E. BURNS, *Primary Examiner.*